United States Patent [19]

Conley

[11] 3,772,676

[45] Nov. 13, 1973

[54] CHARACTER DISPLAY SYSTEM

[75] Inventor: Grant W. Conley, Manchester, N.H.

[73] Assignee: Sanders Associates, Inc., Nashua, N.H.

[22] Filed: Apr. 18, 1972

[21] Appl. No.: 245,082

[52] U.S. Cl. ............. 340/324 A, 315/18, 340/172.5

[51] Int. Cl. ............................................. G06f 3/14

[58] Field of Search ..................... 340/324 A, 172.5; 315/18

[56] References Cited

UNITED STATES PATENTS 3,533,096 10/1970 Bouchard ........................ 340/324 A 3,540,032 11/1970 Criscimagna et al. .......... 340/324 A

*Primary Examiner*—David L. Trafton

*Attorney*—Louis Etlinger

[57] ABSTRACT

A character display system which generates signals for controlling a display device to write any combination of a repertoire of characters is described. The stroke patterns for the various characters are stored as digital words in a Read Only Memory and are read out in response to instructions to write particular characters. The words so read are used to control a function generator which in turn controls the display device. The digital word for each stroke contains an auxiliary bit which specifies if the follow-stroke is to be a continuation of the presently read stroke so that a separate word for the following stroke need not be stored. The Read Only Memory is divided into blocks wherein each block contains the stroke groups for two characters-one group at each end of the block, and the groups are paired according to size to minimize storage space.

12 Claims, 12 Drawing Figures

CHARACTER DISPLAY SYSTEM

FIELD OF THE INVENTION

This invention relates generally to character display systems which are capable of displaying any combination of a repertoire of characters on a surface such as an X-Y table or the viewing screen of a cathode ray tube. The invention relates more particularly to systems in which the characters are formed by successive strokes of a marker such as a pen or an electron beam, as opposed to systems using a raster technique as in home television.

BACKGROUND OF THE INVENTION

In many computer controlled display systems, a computer has stored in its memory any instruction set indicative of the messages to be displayed. These instructions are passed to a character display system, one character at a time. In response to the instruction to display a particular character, a character display system of the stroke tracing type must generate a succession of X and Y deflection signals which direct the movement of the marker as it traces each stroke of the character. It must also generate another signal, sometimes called an intensity signal, which directs the marker either to "write" as it moves or to "not write" as it moves to a new position. All of these signals are applied through suitable buffers, amplifiers and the like, to the actual display device which traces out the characters.

Various arrangements have been used for storing information indicative of the various strokes required to trace out each character and for generating suitable signals in response thereto. In one prior arrangement, sometimes called a "racetrack" system, a single pattern of many strokes is stored and is traced out in its entirety for each and every character. The character is defined by "writing" only those strokes necessary to form the particular character. Such an arrangement is obviously wasteful of time because many unused strokes are traced for each characer. In another kind of system, the information is stored in the form of groups of logic elements and their interconnections with various timing waveforms. Signals indicative of a particular character are generated by enabling certain logic elements and certain timing waveforms. An arrangement of this kind is more fully described in U.S. Pat. No. 3,533,096, granted on Oct. 6, 1970, to Richard J. Bouchard and entitled "Character Display System." The device described by this patent, while a vast improvement over the prior mentioned kind in which the same fixed pattern of strokes is generated for every character, nevertheless has a number of shortcomings. For example, the stroke storing and signal generating equipment is quite bulky. Additionally, there are many, many connections which must be made which means the unit is relatively expensive to manufacture.

It is a general object of the present invention to provide an improved character display system.

Another object is to provide a character display system of reduced size.

Another object is to provide a character display system in which the memory portion is readily manufactured.

Another object is to provide a character display system with improved character definition.

SUMMARY OF THE INVENTION

Briefly stated, a display system incorporating the present invention stores the stroke patterns for the individual characters in digital form in a Read Only Memory. Each stroke for each character is defined as a word. Each character is permitted a maximum of a first predetermined number of strokes. A second predetermined number of word spaces is allotted for storing the strokes for two characters. The second predetermined number may be substantially less than twice the first predetermined number. This is made possible by three features: (1) The two characters to be stored in each allotted space are paired in advance. (2) The words representing strokes for one of the characters are stored beginning at one end of the allotted space, while the words representing the strokes of the other character are stored beginning at the opposite end of the allotted space. (3) Certain redundancies are eliminated. If two successive words are identical, the storage of the second is omitted.

By way of example, it has been found possible, in accordance with the present invention, to set up a stroke pattern allowing twenty-five (or even more, in some cases) strokes per character yet to store the stroke information for two characters in only thirty-two word spaces.

DESCRIPTION OF PREFERRED EMBODIMENT

For a clear understanding of the invention, reference may be made to the following detailed description and the accompanying drawing in which.

Figure 1:
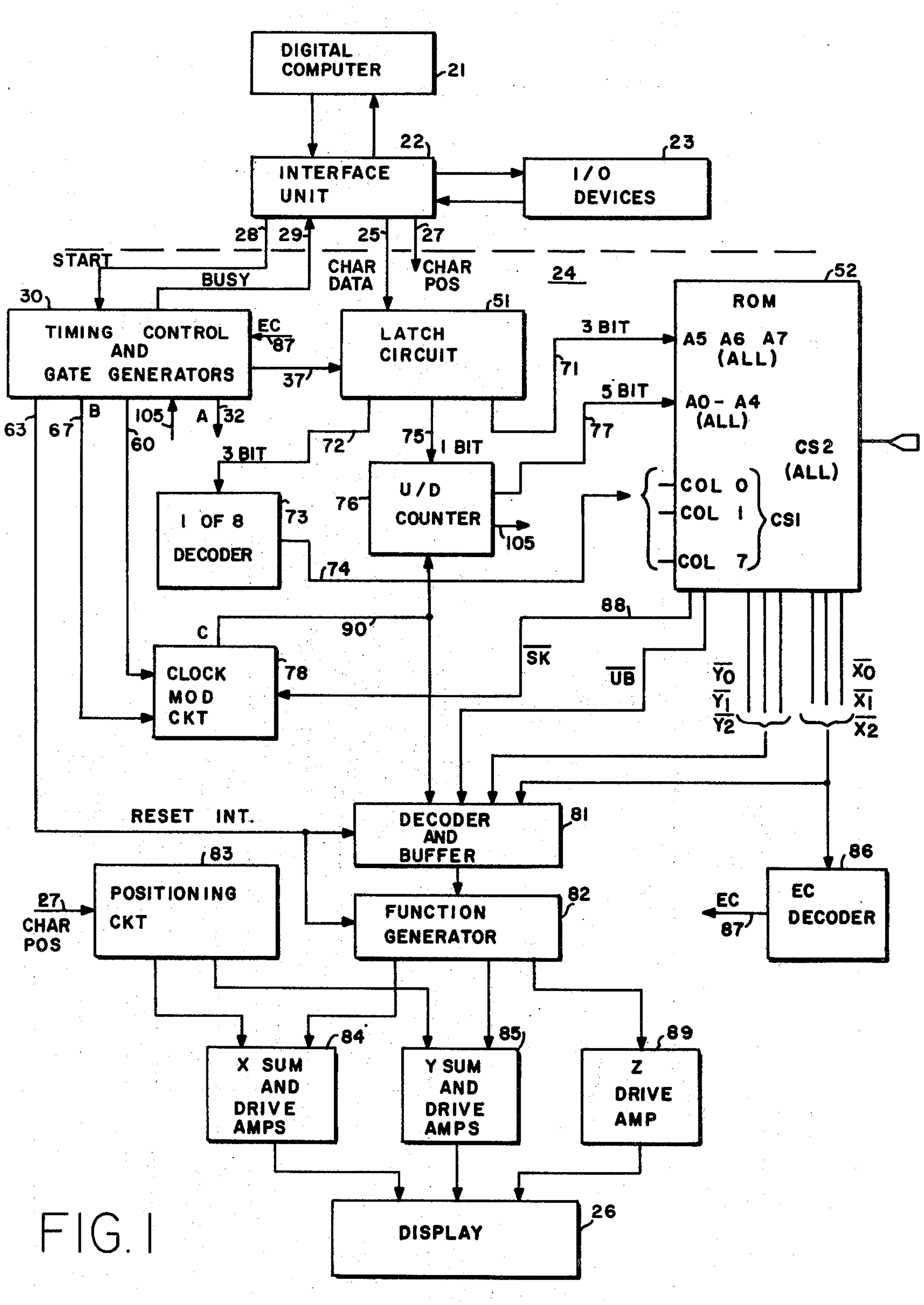
FIG. 1 is a functional block diagram of a display system incorporating the present invention.

Referring first to FIG. 1, an information system incorporating the invention is shown as comprising a digital computer 21 associated with an interface unit 22 by way of which the computer 21 communicates with various input-output (I/O) devices 23 and with the character display system 24 of the present invention (shown below the dashed line). In FIG. 1, communication buses or data flow paths are frequently illustrated by single lines. However, it is to be understood that each such bus or path may comprise a large number of conductors. For example, the character data path 25 transmits, one at a time, digital words each representing a character or symbol to be displayed and the path 25 comprises as many conductors as are required to transmit all the bits of each such word simultaneously. In addition, where such a bus or path is applied as an input or output to a gate or a component, it is to be understood that the number of gates or the number of terminals of the component are sufficient to accommodate all of the conductors of that bus or path.

The computer 21 has a memory in which are stored in digital form words representing characters to be displayed on the display device 26 which is considered, for illustrative purposes, to be a cathode ray tube (CRT) device. The memory of computer 21 also has stored therein instructions as to the sequence, timing and position at which characters are to be displayed on the device 26. When a character is to be displayed, words representing the character and its position are applied to the paths 25 and 27 respectively for transmission to the system 24. A "start" signal is then sent over the path 28 to the system 24 which immediately generates a "busy" signal and transmits it to the interface unit 22 over the path 29 so as to suspend receipt of further instructions until the instant character is displayed. The system 24 then "writes" the specified character on the device 26, in a manner to be more fully explained, and, when finished, removes the "busy" signal, thereby enabling reception of further instructions.

Each set of instructions in the memory of the computer 21 may be updated by means of a stored program contained therein and/or by means of various peripheral devices 23 such as photopens, tape or card reading devices, keyboard devices, and the like. The updating or current sensor data is coupled via the interface unit 22 to the computer 21 where it is processed according to the stored program to update the instructions.

Figure 2:
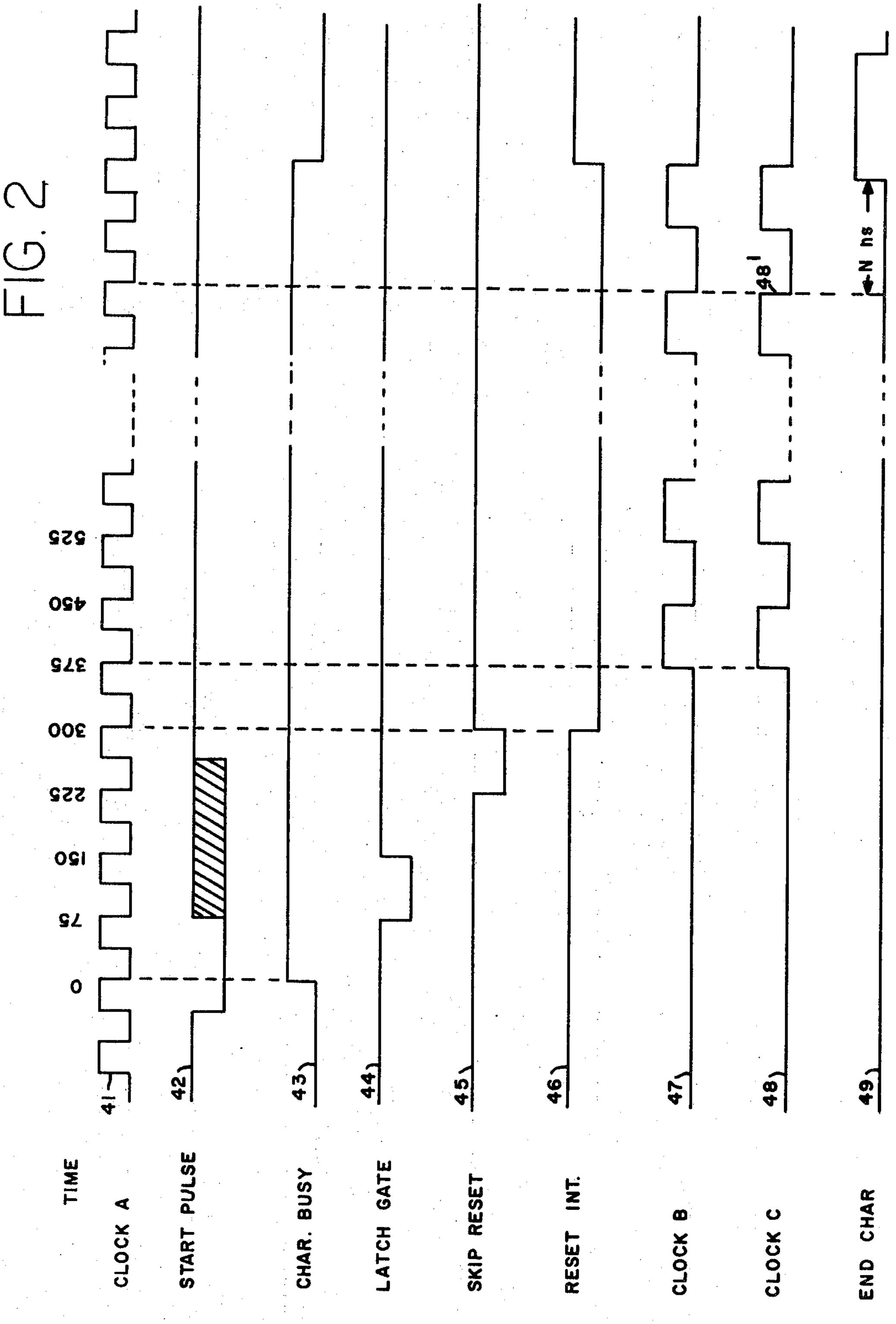
FIG. 2 is a diagram showing the relative times of occurrence of various waveforms.

The character display system 24 includes timing control and gate generating circuits 30 which control the operation of the system by means of various clocks, pulses, gates and other waveforms as illustrated in FIG. 2. Before describing these circuits and waveforms in detail, it is to be noted that throughout the description positive logic is assumed, that is, a logical 1 is represented by a positive voltage (approximately 4 volts) also referred to as "High" or "hi"; a logical 0 is represented by approximately zero volts, also referred to as "low" or "lo"; the flip flop circuits (FF) require an inverted or low signal to reset them directly, as indicated by the conventional inverter symbol on each of these inputs; the basic clock is a positive going square wave with a period of 75 nanoseconds (ns) although a 150 ns clock derived therefrom is also used; and the flip flops and other circuits operated by clock pulses are actuated on the descending, or negative going portion of the pulse. It is also to be noted that logical "AND" circuits are illustrated by the conventional shape with a dot (.) within, while logical "OR" circuits are denoted by the conventional shape with a plus sign (+) within. Inverters are illustrated by small circles (o).

Figure 3:
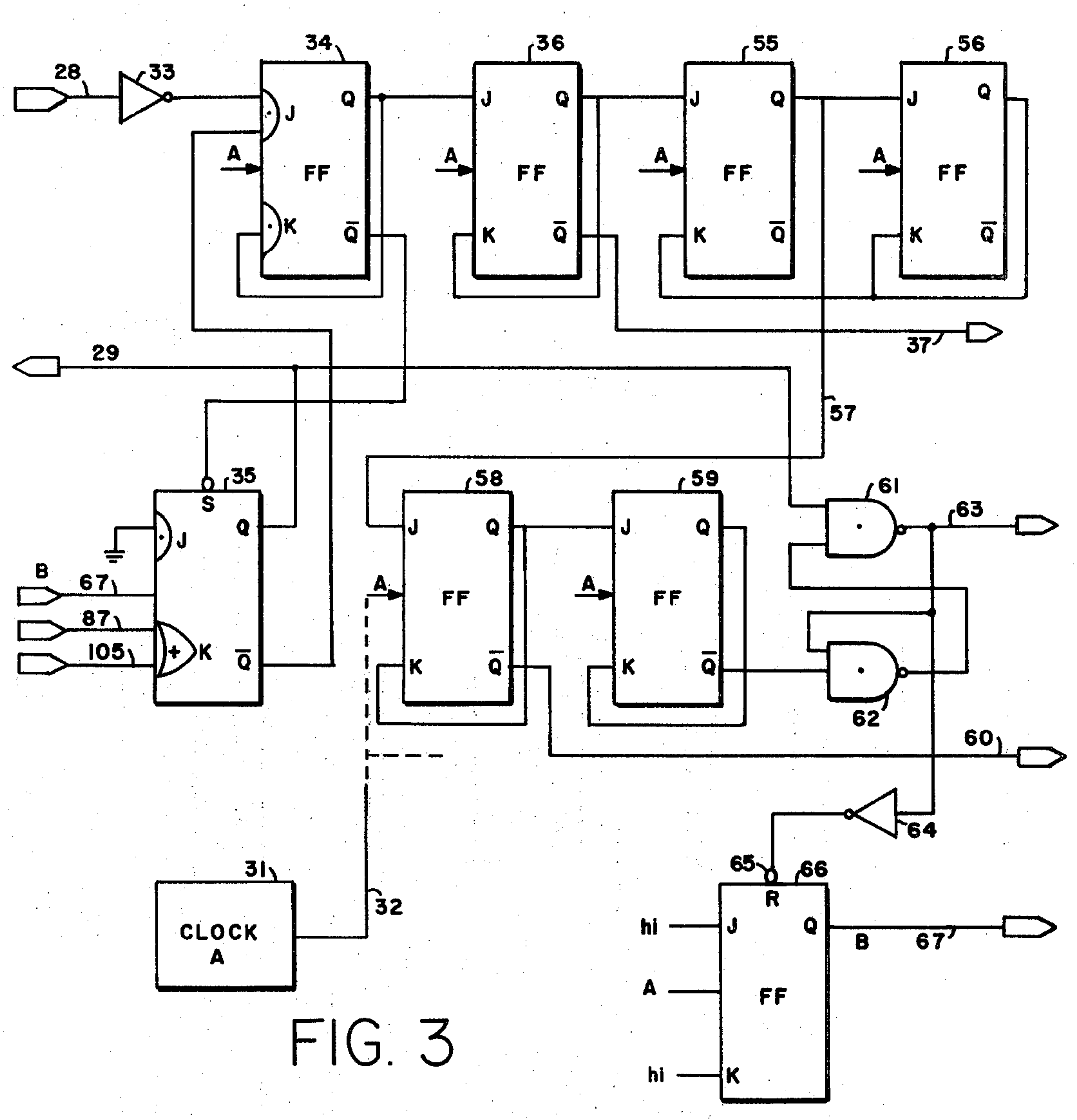
FIG. 3 is a schematic block diagram of the timing control and Gate Generator circuits.

Referring now to FIG. 3, there is shown the previously mentioned clock 31, designated Clock "A", the output of which is connected to a conductor 32 for distribution to various components. Connection to such components is shown in FIG. 3 by a short arrow labeled "A". The waveform of this clock is shown by the curve 41 of FIG. 2. The "start pulse" has the waveform shown by the curve 42 of FIG. 2 and is a negative going pulse whose duration is not critical but is preferably in the range from about 100 ns to 300 ns. As shown in FIG. 3, the conductor 28 carrying this pulse is connected through an inverting amplifier 33 to one of the J inputs of a flip flop circuit 34, which is operated by the clock 31. The Q output of the flip flop 34 is connected to its K input. The $\overline{Q}$ output is connected through an inverter to the SET input of a flip flop 35. The Q output of the latter flip flop is connected to the conductor 29 to carry the "busy" signal back to the interface unit 22. The $\overline{Q}$ output of the flip flop 35 is connected to the J input of the flip flop 34.

Initially, both the J and K inputs of the flip flop 34 are low and accordingly the clock has no effect. Upon receipt of a "start" pulse, the J input goes high whereupon the next occurring negatively going portion of the clock pulse makes the Q output high and the $\overline{Q}$ output low. The latter, "SETS" the flip flop 35 so that the Q output goes high and constitutes the "busy" signal. As shown in FIG. 2, the above mentioned negative going portion of the pulse of clock A is designated time O. As shown by the waveform 43 of FIG. 2, the "busy" signal is a high level signal starting at time 0 but of indefinite duration, being terminated only when the writing of the character is completed, all as will be more fully explained. The next clock pulse at time 75 returns the flip flop 34 to its initial conditions. Because both the J and K inputs are now low, further action of this flip flop must await both the removal of the character busy signal and the arrival of another start pulse.

The Q output of the flip flop 34 is also connected to the J input of another flip flop 36, also actuated by Clock A, the Q output of which is connected back to its own K input. When the Q output of the flip flop 34 goes high at time 0, in the sequence previously explained, it makes the J input of the flip flop 36 high so that the next succeeding clock pulse, at time 75, actuates this flip flop to make the Q output high and the $\overline{Q}$ output low. As shown by the waveform 44 in FIG. 2, the $\overline{Q}$ output remains low until the arrival of the next clock pulse at time 150 whereupon the flip flop 36 is returned to its initial condition. This $\overline{Q}$ output, carrying the waveform 44, is connected to a conductor 37 and constitutes a gate which enables certain other portions of the apparatus, as will be more fully explained.

Referring again to FIG. 1, the path 25 carrying the character data is connected to a latch circuit 51. This data is preferably in the form of a 7 bit digital word representing the desired character in accordance with a predetermined code such as the U.S.A. Standard Code for Information Interchange (ASCII). The bits of the word are transmitted simultaneously over a multiplicity of conductors.

A latch circuit, such as the latch 51, is a form of temporary digital storage. The bits to be stored are applied in parallel as voltage levels to the input. When the latch is enabled by a suitable voltage pulse, the output terminals assume the voltage levels dictated by the input. These outputs continue to be available after termination of the enabling pulse and remain unchanged regardless of the input. Upon receipt of another enabling pulse, the outputs assume the voltage levels dictated by the then present input. Such latches are well known and are available commercially from several manufacturers. One kind suitable for use in the present invention is that marketed by the Fairchild Semiconductor Division of Fairchild Camera and Instrument Corp., Mountainview, Calif., and designated Model 9314. In the preferred embodiment being described, the latch 51 may comprise two such units.

After generation of the character busy signal, the waveform 44 illustrated in FIG. 2 is applied over the conductor 37 to the latch circuit 51 whereupon voltage levels indicative of the various bits of the word appear on the output. Different bits of the word are transmitted to different portions of the apparatus, as will be more fully explained.

Also shown in FIG. 1 is a Read Only Memory (ROM) 52. Such a memory is a digital storage device containing information which cannot be altered during normal operation of the device. The desired storage pattern is inserted during manufacture, that is, before use. All of the bits of each stored digital word are stored at a single address, which, upon the application of a suitable voltage level, cause voltage levels indicative of each bit in the addressed word to appear in parallel, simultaneously, at the output terminals (which are equal in number to the number of bits in each word) for as long as the applied voltage persists. Such Read Only Memory devices are well known and are available commercially from several manufacturers, on example suitable for present purposes being that marketed by the Intel Corp., Mountainview, Calif. as model no. 3301. This unit has a storage capacity of 256 4 bit words. In the preferred embodiment being described, the ROM 52 comprises sixteen such units arranged to store the stroke patterns for 128 characters.

Figure 4:
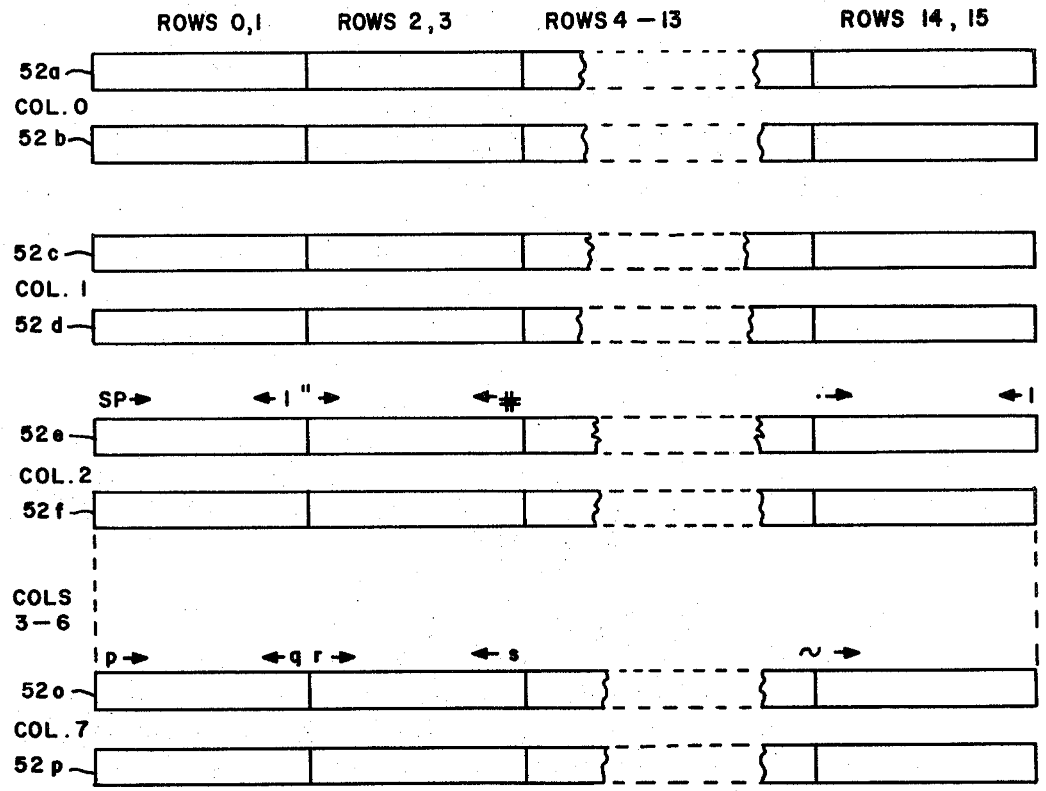
FIG. 4 is a Memory Map, or Pattern Location diagram, showing schematically the arrangement of the various units of the Read Only Memory.

Referring now to FIG. 4, the Memory Map shows the functional arrangement of the 16 units which constitute the Read Only Memory 52. The units are arranged in pairs so that each pair stores 256 8 bit words. The physical arrangement may, of course, be anything which is convenient for mounting and wiring but, for explanation, it is convenient to think of the units as being arranged in the rows and columns of the ASCII code. As shown in FIG. 4, the units **52*a*, 52*b* etc. are shown one below the other across the top of the Figure. For explanatory purposes, the words are assumed to extend horizontally, side by side, with the bits of each word being arranged in vertical rows. Each unit is assumed to be divided into 8 blocks of 32 words each containing 4 bits. Thus, each pair of units, such as the pair 52*a* and 52*b*,** is arranged into 8 blocks of addresses, each block containing 32 addresses and each address containing 1 word of 8 bits.

The remaining units of the memory 52 are designated **52*c* to 52*p* inclusive and are arranged beneath the pair 52*a* and 52*b*** as shown. These pairs are also assumed to be divided into 8 blocks of 32 addresses each. Each block of each pair of units stores the words representing the strokes required to write 2 characters. In the embodiment being described, there are a total of 64 blocks each storing the words necessary to write 2 characters so that a total of 128 characters is provided for.

A study has shown that each character and symbol likely to be encountered in either the English or the Russian alphabets can be written very legibly with not more than 25 strokes. As previously mentioned, the present invention stores the words defining the strokes for two characters in a total of 32 addresses. This is possible for a number of reasons. First, not all characters will require a full 25 strokes so that it is possible to pair a character requiring many strokes with a character requiring few strokes. Additionally, not every stroke requires a separate address, that is, a separate word definition. For example, if the second stroke of a character is to be the same as the first stroke, the word defining the first stroke may include a bit indicating that the next stroke is identical. This being so, it is unnecessary to provide a separate address for the second stroke. This will be explained more fully.

A review of the characters and symbols identified by the ASCII code and a study of the patterns of strokes required to write each has shown that the very arrangements specified by Columns 2 through 7 of the ASCII code (with the exception of "DEL" at Col. 7 Row 15) is suitable for present purposes. That is, the words specifying strokes for the various characters can be stored in the memory 52 just described in exactly the same arrangement as set forth in the above noted portion of the ASCII code and no two paired characters, that is, characters to be stored in a single address block, require more strokes than can be stored in the 32 addresses of each block. Therefore, the patterns representing the various characters are shown in FIG. 4 as being stored in the same rows and columns as specified by Columns 2–7 of the ASCII code for the corresponding characters and accordingly these may be addressed by the ASCII code. Columns 0 and 1 are shown vacant and are available for any special symbols that a particular application may require.

Figure 5:
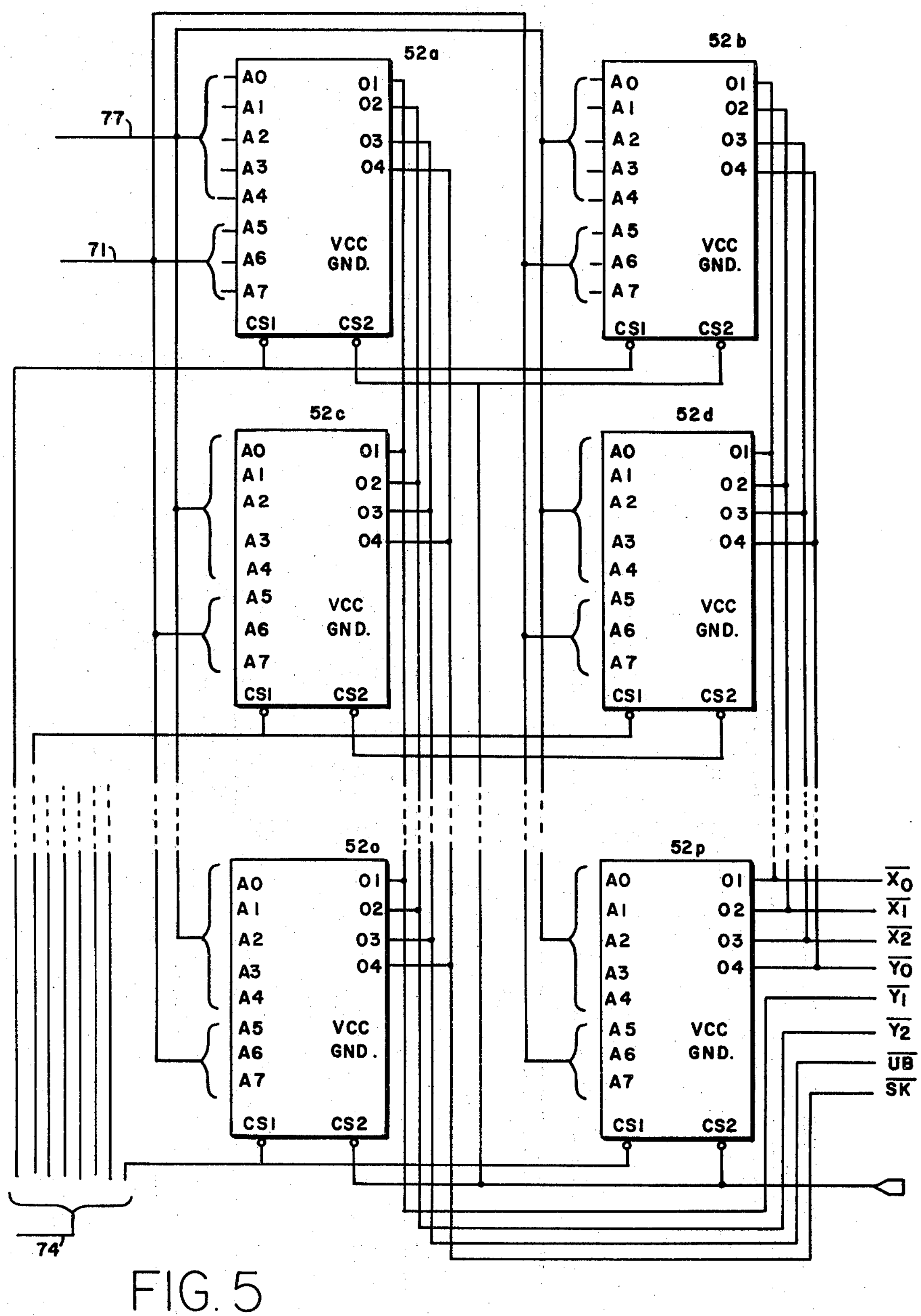
FIG. 5 is a schematic diagram showing the connections among the various units of the Memory.

Referring now to FIG. 5 there are shown the electrical connections to the units **52*a*–52*p* making up the memory 52. Each of the units, for example, the unit 52*a*, includes 8 address inputs designated A0 to A7 inclusive. Each unit is manufactured with an internal decoder so that when it is addressed by an 8 bit code applied to the terminals A0 to A7, one of the 32 addresses has a voltage level applied thereto and thereby is activated. The digital output indicative of the words stored at the particular address appears on the four output terminals, 01 to 04, inclusive. Each unit also includes a terminal designated Vcc to which the supply voltage is connected and a terminal designated GND which is connected to ground. Each unit also has two terminals designated CS1 and CS2 (which are abbreviations for Chip Select 1 and Chip Select 2). These terminals are connected to enable a matrix of internal OR gates connected in the output leads. No output signal will appear on any of the output terminals 01 to 04** inclusive unless a suitable enabling signal is applied to both of the terminals CS1 and CS2.

The address terminals A0 to A7 inclusive of all of the units are connected in parallel. The CS1 terminals of the two units constituting each pair are connected together. That is, the CS1 terminals of units **52*a* and 52*b*, which constitute column 0 are connected together. Similarly, the CS1 terminals of units 52*c* and 52*d* which constitute column 1, are connected together, and the remaining units are similarly connected. All of the CS2 terminals are connected together so that the entire memory 52 can be enabled or disabled with a single signal. The output terminals 01 to 04 of all of the first units of each pair are connected together as are the output terminals of all of the second units of each pair. That is, the output terminals of units 52*a*, 52*c*, 52*e*, etc., are connected together and the output terminals of units 52*b*, 52*d*, and 52*f*** etc., are all connected together.

Before considering the connections of the memory 52 to the remainder of the apparatus, it is well to consider the various timing gates and waveforms and how they are generated. Referring to FIG. 3, the Q output of the flip flop 36 is connected to the J input of a flip flop 55 the Q output of which is connected to the J input of another flip flop 56. The flip flops are both actuated by the clock A. The Q output of the flip flop 56 is connected to the K inputs of both of the flip flop 55 and 56, while the Q output of the flip flop 55 is connected by a conductor 57 to the J input of a flip flop 58. The Q output of the latter is connected to its K input and to the J input of a flip flop 59, the Q output of which is connected to its own K input. The flip flops 58 and 59 are also actuated by the Clock A. The $\overline{Q}$ output of the flip flop 58 is connected to a conductor 60 so as to control other portions of the apparatus, as will be more fully explained.

It is to be noted that initially, before time 0 and in the absence of both a character busy signal and a start pulse, the J and K inputs and the Q outputs of all the flip flops 34, 36, 55, 58, and 59 were low while all the $\overline{Q}$ outputs were high. It will be recalled that at time 75, Q36 (the Q output of flip flop 36) went high. This made the J 55 (the J input of flip flop 55) high. Therefore, at time 150, Q55, J56 and J58 go high. At time 225, Q56, K55, K56, Q58 and J59 go high. Also at time 225, $\overline{Q}$ 58 and conductor 60 go low and constitute a skip reset gate as shown by the waveform 45 of FIG. 2, for purposes to be more fully explained. At time 300 Q55 and conductor 57 go low. Also at time 300, Q59 goes high while $\overline{Q}$ 59 goes low. The voltage of $\overline{Q}$59, and the voltage of conductor 29, carrying the "character busy" signal are used to generate a "reset integrator" signal which directs the establishment and renewal of a suitable resetting circuit such as one which discharges the capacitors used in the function generator or otherwise prepares the function generator for a new operation.

A pair of NAND circuits 61 and 62 each comprising an AND circuit with an inverter in the output are connected as a flip flop. More particularly, the conductor 29 is connected to one input of the circuit 61, while the $\overline{Q}$ output of flip flop 59 is connected to one input of the other circuit 62. The output of circuit 61 is connected to the other input of circuit 62 and the output of circuit 62 is connected to the other input of circuit 61. The output conductor 63 is connected to the output of circuit 61. Initially, that is, after the completion of one character and before starting the next, the conductor 29 (see waveform 43 FIG. 2) is low while $\overline{Q}$ 59 is high. Accordingly, the output of circuit 61 is high. This constitutes the "reset integrators" signal as shown by the initial portion of waveform 46 of FIG. 2. This signal must be removed before a new character is written. When conductor 29 goes high, nothing happens because the other input to circuit 61 is low. But when $\overline{Q}$ 59 goes low, at time 300, the output of circuit 61 and conductor 63 go low, as shown by the waveform 46 of FIG. 2, while the output of circuit 62 goes high. These conditions persist, even after $\overline{Q}$ 59 reverts to high at time 375, until the character busy signal is removed allowing conductor 29 to go low, whereupon the initial conditions are reestablished.

The "reset integrators" signal on conductor 63 is also used to enable the generation of a 150 ns clock. Conductor 63 is connected through an inverting amplifier 64 to the "Reset" terminal of a flip flop 66. This flip flop is also actuated by the clock A and has both its J and K inputs permanently connected to a "high" voltage source. The Q output is the desired 150 ns clock, designated clock B, and is connected to a conductor 67.

Before time 300, the conductor 63 is high, as shown by the waveform 46 of FIG. 2, and the flip flop 66 is "Reset" so that the Q output is low. At time 300, the "Reset" signal is removed so that, beginning with the next clock pulse at time 375, the flip flop 66 toggles, thereby generating a 150 ns clock (clock B) on conductor 67 as shown by waveform 47 of FIG. 2.

The clock C, shown by the waveform 47, is derived from clock B and, as far as those portions shown in FIG. 2 are concerned, is substantially identical to clock B. It differs when a "SKIP" is called for as will be more fully explained subsequently.

Referring back to FIG. 1, it will be recalled that the output of the latch circuit 51 is a 7 bit ASCII word which defines the next character to be written. The three most significant bits of this word are connected over a path 71 to the A5, A6, and A7 address terminals of the memory 52. These three bits select one of the address blocks of the memory 52. Referring to FIG. 4, these bits select that block of all the units which represents one of the double rows such as the rows 0 and 1 or the rows 2 and 3 or the rows 4 and 5, etc.

The next three most significant bits from the latch circuit 51 are connected by means of a path 72 to a one of eight decoder 73. The decoder 73 is a conventional device which places a signal on that one of eight output conductors which is designated by the input signal. These output conductors are represented collectively by the path 74 and are connected to the CS1 terminals of those units representing columns 0 to column 7 respectively. In other words, the first conductor is connected to the CS1 terminals of units **52*a* and 52*b*, the next conductor is connected to the CS1 terminals of units 52*c* and 52*d*, etc. Referring again to FIG. 4 the decoder 73** selects the column. Thus, the first six bits together have selected one block of addresses in one particular pair of units. Each one of these blocks of addresses, as previously mentioned, contains the words representing the strokes for two characters and it is necessary to select between them.

Referring back to FIG. 1 again, the last bit of the ASCII code from the latch circuit 51 is connected over a path 75 to an up/down counter 76. This counter is a conventional five bit unit, and, in response to successive clock pulses, generates successive five bit signals on five output conductors running successively "up" from 00000 to 11111 or alternatively, running "down" from 11111 to 00000. Whether it counts up or down is selected by the last bit applied thereto over the path 75. The five conductors of the output are represented by the path 77 and are applied to the address inputs A0 to A4 inclusive of the memory 52. This has the effect of addressing and reading out sequentially the words stored in the addressed block starting from the left end or the right end depending upon whether the counter is conditioned to count up or down. The counter 76 is controlled by a 150 nanosecond clock C, indicated by the waveform 47 of FIG. 2, which is a modified version of the clock B. Modification is accomplished by a clock modifying circuit 78 the function and operation of which will be explained subsequently.

Figure 6:
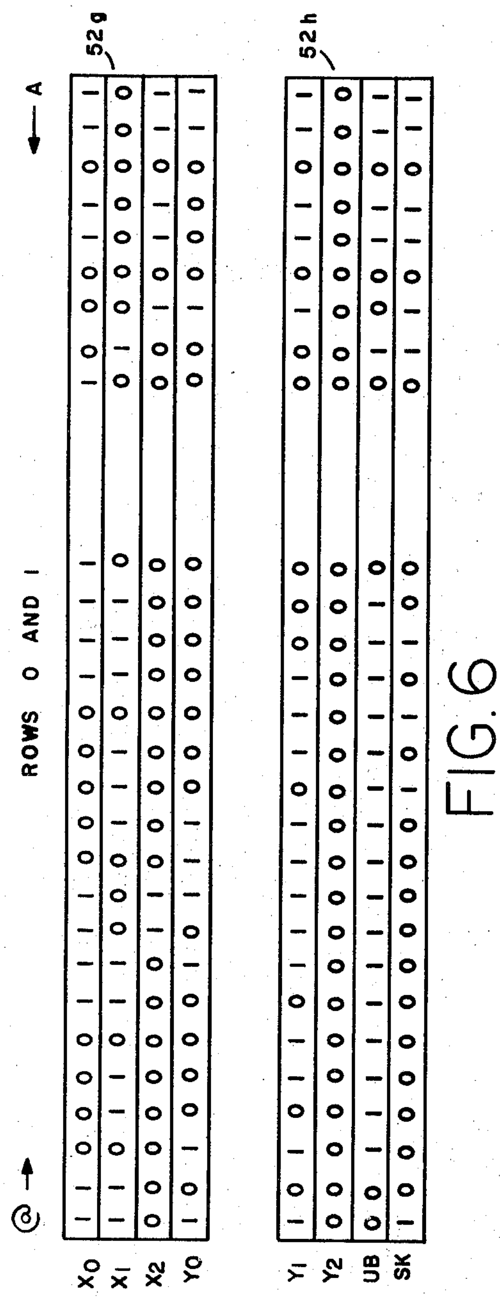
FIG. 6 is a diagram showing the arrangement of word storage in a portion of the Memory.

Referring now to FIG. 6 there are shown the portions of the units 52g and 52h corresponding to ASCII column 4 and ASCII rows 0, 1. In this address block are stored two groups of words, one representing the pattern of required strokes to write the character « and the other representing the pattern of strokes required to write the Capital A. The first group representing @, has nineteen words which are stored in adjacent addresses starting at the left end of the block. The second group, representing A, has nine words which are stored in adjacent addresses starting at the right end of the block. There are 32 addresses in the block, each capable of storing an 8 bit word, although not all the addresses are used. The various ones and zeros represent the digits stored in each space.

Figure 8:
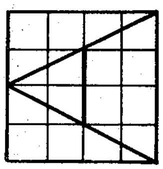
FIG. 8 is a diagram of the strokes used to write the character A.
Figure 7:
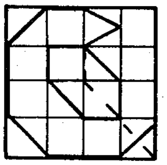
FIG. 7 is a diagram of the strokes used to write the character @.

Referring now to FIG. 7 there are shown schematically 22 strokes used to write the character @. The instructions for these strokes are shown in coded form in the left hand portion of FIG. 6. FIG. 8 shows the 12 strokes required to write the capital A. The instructions for these strokes are shown in coded form on the right hand portion of FIG. 6. In each case, each instruction is an 8 bit word and the bits are designated, from top to bottom in FIG. 6, as $X_0$, $X_1$, $X_2$, $Y_0$, $Y_1$, $Y_2$, UB and SK. These codes have the meanings shown in Table I.

TABLE I

| $X_0$ | $X_1$ | $X_2$ | $Y_0$ | $Y_1$ | $Y_2$ | UB | SK | |
|---|---|---|---|---|---|---|---|---|
| 1 | 0 | 0 | ← | Any | | | → | End of Character |
| ← | Any other than Above | | | ↓ | → | 1 | | Unblank |
| | | | | ↓ | | 0 | | Blank |
| | | | | ↓ | | | 1 | Skip |
| | | | | ↓ | | | 0 | No Skip |
| 0 | 0 | 0 | 0 | 0 | 0 | 0 | 0 | No Change |
| 0 | 0 | 1 | ← Any → | | ← Any → | | | −X/2 |
| 0 | 1 | 0 | | ↓ | | ↓ | | −X |
| 0 | 1 | 1 | | ↓ | | ↓ | | −3X/2 |
| 1 | 0 | 1 | | ↓ | | ↓ | | +X/2 |
| 1 | 1 | 0 | | ↓ | | ↓ | | +X |
| | 1 | 1 | | ↓ | | ↓ | | +3X/2 |
| 1 ← Any → | | | 0 | 0 | 1 | ↓ | | −Y/2 |
| | | | 0 | 1 | 0 | ↓ | | −Y |
| | | | 0 | 1 | 1 | ↓ | | −3Y/2 |
| | | | 1 | 0 | 1 | ↓ | | +Y/2 |
| | | | 1 | 1 | 0 | ↓ | | +Y |
| | | | 1 | 1 | 1 | ↓ | | +3Y/2 |

Figure 9:
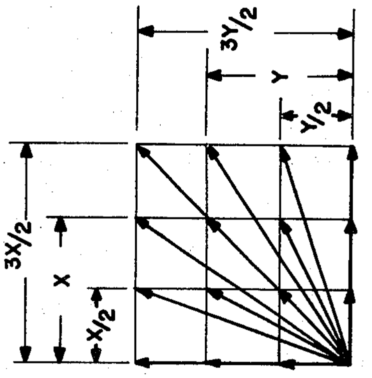
FIG. 9 is a diagram illustrating the various strokes which may be traced in the first quadrant.

It is apparent from Table I that the outputs of the memory 52 are coded digital signals indicative of the rate and direction of movement and intensity required of a marker to write the selected character. It is possible to trace lines in various directions for various distances in each unit of time. Regarding the X direction first, it is possible to trace lines in either the positive or the negative direction a distance equal to one half of one of the spaces indicated in FIGS. 7 and 8, or a whole space, or one and one half spaces. Similarly, lines can traced in the Y direction, either positively or negatively by corresponding amounts. This allows the generation of lines in any quadrant corresponding to those shown in FIG. 9 for the first quadrant. The starting position of the marker is the point S at the lower left hand corner as shown in FIGS. 7 and 8. The UB (unblank) signal is used to control the intensity of the beam, that is, whether to leave it blanked out so that the beam does not write anything or to unblank it causing it to write. The SK (skip) signal is used to indicate whether the next succeeding stroke is the same as the one now being written, as will be more fully explained.

Referring again to FIG. 1, the particular units used to form the memory 52 provide for low or zero outputs as logical ones. Accordingly, in terms of the logic used throughout the rest of the equipment, the outputs are $\overline{X0}$, $\overline{X1}$, $\overline{X2}$, $\overline{Y0}$, $\overline{Y1}$, $\overline{Y2}$, $\overline{UB}$ and $\overline{SK}$. All six of the X and Y outputs are passed to a decoder and buffer matrix 81 which is controlled by the same clock C as controls the up/down counter 76. In this matrix, the outputs are decoded into terms of the desired X and Y motions of the beam, stored temporarily, and passed to a function generator 82 which may include integrators and be generally similar to that described in the aforementioned U.S. Pat. No. 3,533,096. The outputs of the function generator 82 are combined with the outputs of a positioning circuit 83 in an X sum and drive amplifier 84 and a Y sum and drive amplifier 85 and are then passed to the display 26. The $\overline{X0}$, $\overline{X1}$, and $\overline{X2}$ outputs are also passed to an EC decoder 86 which decodes them to generate an EC (end of character) signal after the character has been written. This signal is transmitted via the path 87 to the K input of the flip flop 35 (FIG. 3) so that the character busy signal is removed at the next clock pulse. Also, after the removal of the character busy signal, the reset integrator waveform is applied via the path 63 to the decoder 81 and to the function generator 82 so as to make them ready for the next character. The $\overline{SK}$ output of the memory 52 is transmitted over a path 88 to the clock modification circuit 78 the details of which will be explained subsequently. The $\overline{UB}$ output of the memory 52, after suitable buffering, is transmitted to a Z drive amplifier 89 which, in turn, controls the intensity of the display device 26.

Referring again to FIG. 6, the operation of the device will be explained in connection with the writing of the character A. The group of words defining the strokes for this character are at the right in FIG. 6. Accordingly, when the latch circuit 51 is enabled by the latch gate (waveform 44 of FIG. 2) the last bit of the ASCII code directs the U/D counter 76 to count down and presets it to 11111. This count is transmitted over the path 77 to the ROM 52 thereby reading out the word on the extreme right. This word as read out is transmitted immediately to the decoder and buffer 81 but does not become effective at the output thereof until the reset integrator signal (waveform 46 of FIG. 2) is removed at time 300 and the negative going portion of the first pulse of clock C (Waveform 48 of FIG. 2) arrives at time 450. Examining the first word more particularly, the first bit $X_0$, is a one which indicates that the motion of the marker, which, in this case, is the beam of the CRT, in the X direction is positive. The next 2 bits, $X_1$ and $X_2$, are 0 and 1 respectively, indicating, as shown by Table I, that the beam is to move one half a space as those spaces are indicated in FIGS. 7 and 8. The $Y_0$ output is a 1 indicating that the beam is to move positively in the Y direction. The Y1 and Y2 outputs are 1 and 0, respectively, indicating that the beam is to move one Y space during this period. The UB bit is a 1 indicating that the beam should be unblanked so that a visible trace will be made. The skip pulse is also a 1 indicating that the second stroke is identical to the first. Therefore, it is unnecessary to store this second word since it is merely a duplication of the first. The writing of the second stroke is accomplished by skipping a clock pulse so that the decoder and buffer matrix 81 maintains its outputs unchanged for another clock period with the result that the function generator 82 continues to generate ramp voltages at the same rates as before. The apparatus by which the outputs are maintained by skipping a pulse is shown in detail in FIG. 10.

Figure 10:
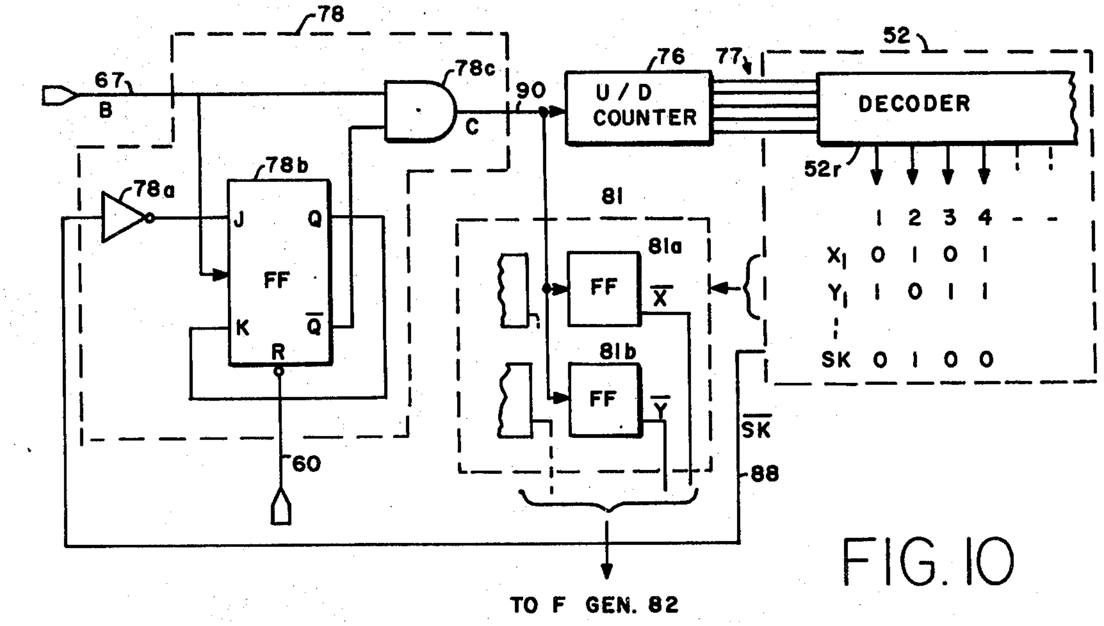
FIG. 10 is a schematic block diagram of the clock modifying circuit and other portions of the apparatus.

Referring now to FIG. 10, the "skip" function will be explained with the aid of a simplified example. There is shown schematically a portion of the Read Only Memory 52 including the internal decoder **52*r* which receives the 5 bit count over the path 77 from the up/down counter 76. In response to this changing count, the decoder 52*r* activates, that is, reads out, the words in the selected group of addresses successively. For illustrative purposes only four addresses are shown. It is assumed that this group has already been selected; that the words representing the strokes for the hypothetical character are stored beginning at the left of the address space; and that the last bit of the ASCII code has been transmitted from the latch circuit 51 to the U/D counter 76 thereby resetting it to 00000 and directing it to count "up." For simplicity, only three outputs will be considered, namely, X1, Y1, and Sk. The X and Y outputs are transmitted to the decoder and buffer matrix 81. The buffers corresponding to +X and +Y are shown as 81*a* and 81*b* respectively. In this simplified example it is assumed that whenever a "1" appears in the X1 or Y1 output, that the corresponding flip flop 81*a* or 81*b* is actuated by the next clock pulse. These flip flops, as well as the remaining flip flops in the matrix 81, are actuated by the same clock pulses (clock C) as are used to actuate the up/down counter 76.**

The skip output of the memory 52 is transmitted over the path 88 to the clock modifying circuit 78. More particularly, the path 88 is connected to the input of an inverting amplifier **78*a* the output of which is connected to the J input of a flip flop 78*b* which flip flop is actuated by the clock B. The Q output of the flip flop 78*b* is connected to its own K input. The reset terminal is connected to the conductor 60 which, it will be recalled from the discussion of FIGS. 1, 2 and 3, carries a negative going "skip reset" pulse of seventy five nanoseconds duration beginning at time 225. The $\overline{Q}$ output which is now a "one" is connected to one input of an AND circuit 78c the other input of which is connected to the conductor 67 carrying the clock B. The output of the AND circuit is connected by means of a path 90 to the up/down counter 76 and to the decoder and buffer matrix 81.**

Figure 11:
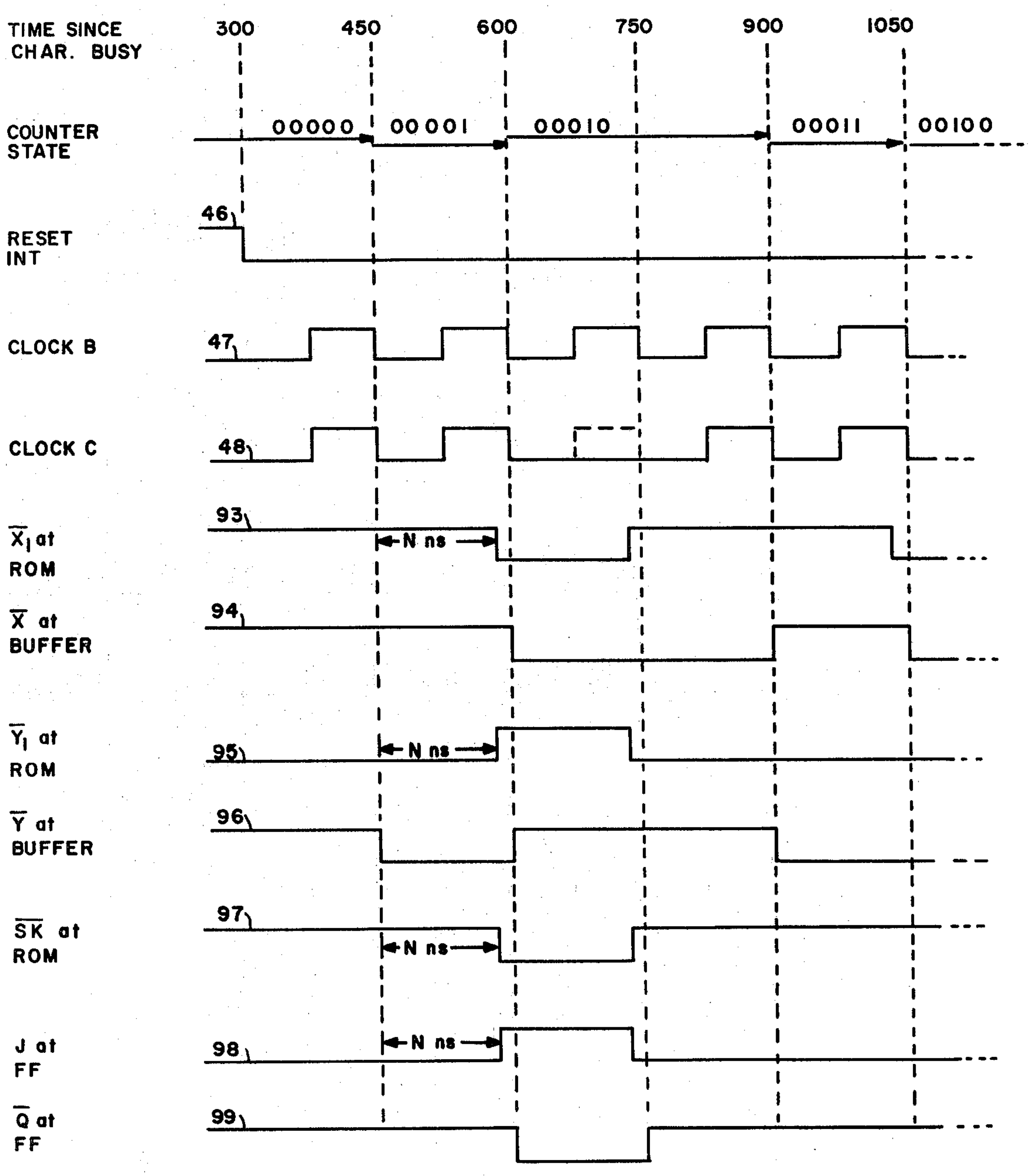
FIG. 11 is a diagram showing the relative times of occurrence of additional waveforms.

FIG. 11 shows the state of the U/D counter 76 and the various waveforms associated with the illustrative example of FIG. 10. Prior to time 300 (300 ns after generation of the "character busy" signal) the counter 76 had been reset to 00000, as previously explained, and therefore the first word of the example had already appeared at the output of the ROM 52. Since $X_1$ is zero, the $\overline{X}_1$ output is high at this time as indicated by the waveform 93. Similarly, $Y_1$ is one and the $\overline{Y}_1$ output is low as indicated by the waveform 95. Skip is zero and the $\overline{SK}$ output is high as shown by the waveform 97. None of these outputs have any further effect at this time. The J input to the flip flop **78*b* is low, as shown by the waveform 98, and the $\overline{Q}$ output remains high (having been "reset") as shown by the waveform 99. Both this $\overline{X}$ and $\overline{Y}$ outputs of the buffer 81 are high, as indicated by the waveforms 94 and 96 respectively, due to the previous action of the reset integrator signal (waveform 46 of FIGS. 2 and 11**).

At time 300, the reset integrator signal is removed from the decoder and buffer 81 and from the function generator 82 thereby conditioning these components to utilize new inputs. Seventy five nanoseconds later the first positive going portion of Clock B (Waveform 47) is generated. Since $\overline{Q}$ of flip flop **78*b* is high, this portion of clock B on conductor 67 (FIG. 10) passes through the AND circuit 78*c* and appears on conductor 90 as clock C (waveform 48**).

At time 450 the first negative going portion of both clocks B and C occurs. The latter is applied to the decoder and buffer 81 including the flip flops 81a and 81b. Since $X_1$ of the first word is zero, the $\overline{X}$ output of the buffer 81 remains high, as shown by the waveform 94. However, $Y_1$ of the first word is one and accordingly the $\overline{Y}$ output of the buffer becomes low at this time as indicated by the waveform 96.

The clock C is also applied to the U/D counter 76 and the negative going portion at time 450 initiates the changing of the count from 00000 to 00001 and the reading of the second word from the ROM 52. There is a finite delay of N nanoseconds from the time the pulse arrives at the counter 76 until the corresponding voltage levels appear at the output of the ROM 52. This delay may be on the order of 135 ns. $X_1$, $Y_1$, and SK of the second word are one, zero and one respectively, and accordingly the $\overline{X}_1$, $\overline{Y}_1$ and $\overline{SK}$ outputs of the ROM 52 go low, high and low, respectively N nanoseconds after time 450, as shown by the waveforms 93, 95 and 97. This low skip output, after inversion makes the J input of the flip flop **78*b* high immediately, as shown by the waveform 98.**

At time 600 the negative going portion of the clock C actuates the flip flops **81*a* and 81*b* so that the $\overline{X}$ and $\overline{Y}$ outputs of the buffer 81 go low and high respectively to indicate the corresponding values in the second word. At the same time clock C is also applied to the U/D counter 76 thereby initiating the changing of the count from 00001 to 00010 and the reading of the third word from the ROM 52. N nanoseconds later the $\overline{X}_1$, $\overline{Y}_1$ and $\overline{SK}$ outputs of the ROM 52 go high, low and high respectively corresponding to the values zero, one and zero of the third word, as indicated by the waveforms 93, 95 and 97.**

Also at time 600, the negative going portion of clock B is applied to the flip flop 78b and, since J is high, $\overline{Q}$ becomes low as shown by the waveform 99 of FIG. 11. This low condition blocks the AND circuit 78c so that the next positive going portion of clock B (occurring at time 675) cannot pass through, thereby inhibiting what would normally be the corresponding pulse of clock C. The pulse thus inhibited is shown by the dotted portion of the waveform 48 in FIG. 11. since there is no negative going portion of clock C at time 750, none is applied to the decoder and buffer 81 at this time. The $\overline{X}$ output remains low and the $\overline{Y}$ output remains high as shown by the waveforms 94 and 96, and the function generator 82 continues to generate ramp voltages at the same rates as before.

Similarly there is no pulse from clock C to be applied to the U/D counter 76 at this time and, accordingly, at time 750, there is no change and the count remains at 00010. The $\overline{X_1}$, $\overline{Y_1}$, and $\overline{SK}$ outputs of the ROM 52 also continue at their former values. However, clock B continues uninhibited and at time 750 $\overline{Q}$ of flip flop 78*b* is returned to the high condition thereby unblocking the AND circuit 78*c*.

At time 900 there are negative going portions of both clocks B and C and the process continues in much the same way. Briefly stated, clock C actuates the buffer 81 to reflect the outputs corresponding to the third word, that is, X high and Y low. Also, the counter 76 is advanced to 00011 and N nanoseconds later the outputs of the ROM 52 correspond to the fourth word, namely, $\overline{X_1}$, low and $\overline{Y_1}$ also low.

In summary, it is apparent that the presence of a one in the skip bit of a word causes the same end result as if the same word were read again by the next succeeding clock pulse. However, this is accomplished without the necessity for storing the same word a second time.

It is to be noted that, in the absence of a skip signal, each word appears at the output of the buffer during the clock period next following that in which it first appears at the output of the memory. The effect of the skip signal in any word is to hold or store that word in the buffer for an additional clock period and to simultaneously hold or store the next succeeding word at the memory output for the same additional clock period.

Returning now to FIG. 6 and the illustration of the writing of the capital A, it will be recalled that the reading of the first word directed the beam to move one half space in the X direction and a full space in the Y direction. This resulted in the writing of that portion of the left leg of the A, as shown in FIG. 8, starting with the point s and extending halfway to the cross bar. Since the skip bit of the first word is a 1, the next stroke is merely a continuation of the first and carries the line up as far as the cross bar. Since the third and fourth strokes of the A are identical to the first and second, the second word which is next read is identical to the first. It would be possible, with further complication of the apparatus, to allow for skips of various durations but the occasions on which such additional apparatus would be used are thought to be not frequent enough to warrant their inclusion. Therefore, provision is made only for a one step skip, that is, for making only one stroke the same as that previous without recording an additional word. Accordingly, the second word is identical to the first and directs the writing of the third and fourth strokes so that the beam reaches the apex of the A as indicated in FIG. 8.

The next word is read out beginning at the start of the fifth writing time period. This word is all zeros. This directs the beam to remain stationary at its then attained position but blanked out for one time period. The reason for this is that the various amplifiers have finite band widths and it is found, if it is attempted to radically alter the direction of an unblanked beam such as that occurring at the apex of the A, that the beam never quite reaches the apex but tends to follow an arc as it reverses direction, never quite reaching the full height of the character. If such a character, for example A, is written adjacent to another character, such as a Z, with a horizontal portion at the top, the letter A will appear to be substantially shorter than the letter Z. It has been found that the expedient of directing the beam to dwell blanked out for one clock period overcomes this difficulty. Such direction is useful in all characters, such as A, V, N and others, which have the vertex of an acute angle at either the top or the bottom of the character or which require complete direction reversal, as at the bottom of the right leg of the A. The coding of all 0's for one time period directs the ramp generators to stop where they are and remain there until directed to continue by the next signal.

The fourth word is read during the sixth writing time period and directs the beam downward from the apex of the A. It is thought that the explanation of this and the succeeding words will be obvious from that previously given and need not be discussed in detail. It is, however, to be noted that at the bottom of the A the beam is again held stationary during the tenth writing time period for the same reasons as that it was held stationary at the top of the A. It is also noted that during the 11th and 12th time periods the beam is blanked out because it is retracing a previously written path. Additionally, after the A has been completely written, the next and last word, read during the fifteenth time period, is coded to denote the end of the character by making X0 = 1, X1 = 0, and X2 = 0. When this occurs, the EC decoder 86 generates a signal which is passed to the K input of the flip flop 35 (FIG. 3) so that at the next clock pulse, Q goes low thereby removing the character busy signal. As previously mentioned, this removal of the busy signal on path 29 signals the interface unit 22 that the system 24 is now in condition to receive instructions to write another character. The end of character signal initiates the generation of the reset integrator signal which prepares the decoder matrix 81 and the function generator 82 to write the next character.

Figure 12:
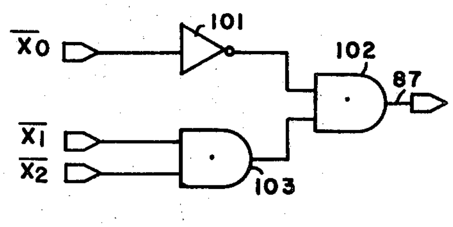
FIG. 12 is a schematic block diagram of the End of Character Decoder.

The End of Character (EC) decoder is shown in FIG. 12. The $\overline{X_0}$ output of the memory 52 is connected to the input of an inverting amplifier 101 the output of which is connected to one input of an AND circuit 102. The $\overline{X_1}$ and $\overline{X_2}$ outputs of the memory 52 are connected to first and second inputs of an AND circuit 103 the output of which is connected to the other input of an AND circuit 102. It is apparent that the output of the latter circuit will be one when and only when $X_0 = 1$, $X_1 = 0$ and $X_2 = 0$. The end of character signal is shown by the waveform 49 of FIG. 2. In this Figure, it is assumed that the end of character word is read as a result of the application of Clock pulse 48' to the Up/Down counter 76, so that this word ($X_0 = 1$, $X_1 = 0$, $X_2 = 0$) appears at the output of the memory 52 N nanoseconds later and the signal itself at the output of the circuit 102 very soon thereafter. This output is connected to a path 87 which, as previously mentioned, is connected to the K input of the flip flop 35 (FIG. 3) in order to terminate the character busy signal and to discontinue generation of the clocks B and C.

A back up, or fail safe feature is provided in case there is no "end of character" word encoded in the block being addressed. Such absence could occur if, for example, in some case it were necessary to use all 32 positions in one of the blocks for words representing strokes, leaving no place for an "end of character" word. As another example, it is possible that one or more blocks might be unused, yet might be interrogated. In either case, operations should be terminated just as if an "end of character" word were present. To this end, the U/D counter 76 includes an ouput on conductor 105 which is normally low but which goes high after the counter has completed thirty two counts in either direction. The conductor 105 is also connected to the K input of the flip flop 35 (which has an internal OR circuit) so that, should there be no end of character signal, the "end of count" signal from the counter 76 will terminate operations.

It is to be noted that the capital A has been written with twelve separate strokes each occupying one time period. In addition, the beam has been caused to dwell for one time period on two separate occasions. Therefore, the character has been written in fourteen time periods. However, the instructions for writing the entire letter are contained in only nine words of 8 bit bits each, which of course, occupy only nine addresses.

The character @ is written in similar manner by reading that portion of the unit 52*g* and 52*h* which is illustrated in FIG. 6, starting at the left. It is thought that the manner in which it is written will be apparent from the discussion previously given in connection with a capital A. However, it is to be noted that there are no directions for the beam to dwell for one time period, as there were for the letter A. This is because, although the illustrated stroke pattern for the character prescribes several sharp corners, none form a point at either the top or the bottom of the character. In the case of the character @ a slight rounding effect is beneficial rather than detrimental. It is also to be noted that the entire character is written in 22 time periods and that another one is used for the end of character code. However, only ninteen words are required to completely define the character. It is also to be noted that the character @ and the letter A are quite suitable to be paired because, although the character @ requires many strokes, the character A requires fewer strokes and both are easily fitted into the 32 word spaces with some to spare.

From the foregoing it will be apparent that Applicant has provided an improved character display system in which the memory portion is considerably simplified over that of the prior art. Manufacture is quite inexpensive because the read only memory used may be programmed easily to store the desired strokes.

It is also to be noted that an actual commercial embodiment of a system in accordance with the invention may include many additional features which have been omitted from the present disclosure in the interest of clarity. For example, it is possible to incorporate the features of writing at various speeds and/or writing characters in different sizes. Additionally, in some situations it may be desired to start the letter at the center of the space rather than at the lower left hand corner as illustrated. However, all of these techniques are well known to those skilled in the art.

It will be also noted that although the ASCII code has been described, it would be possible to use other codes for other particular purposes. In addition in the present invention it is a simple matter to change the repertoire of characters simply by changing the memory 52. Additionally, the number of characters can be doubled simply by adding another memory and selecting one or the other by suitable signals applied to the CS2 inputs of all of the units.

Although a preferred embodiment has been described in considerable detail for illustrative purposes, many modifications will occur to those skilled in the art. It is therefore desired that the protection afforded by Letters Patent be limited only by the true scope of the appended claims.

What is claimed is:

1. A stroke signal generating system, comprising, a memory for storing a plurality of groups of digital words, each word representing in coded form a stroke to be traced, each group representing the strokes required to write one character, said memory being divided into a plurality of blocks each having the same number of adjacent addresses and each block being for storing two groups of words at addresses beginning at opposite ends thereof, means for selecting a desired one of said blocks, means for selecting one of the ends of said block and for reading sequentially the words in that group which are stored at addresses beginning at the selected end, and means for decoding said words and deriving from each signals indicative of stroke direction and intensity.

2. A system in accordance with claim 1 in which said means for selecting and for reading includes an up-down counter for sequentially reading words in the selected block beginning at that end determined by the counting direction selected.

3. A system in accordance with claim 1 in which each of said words includes coded information specifying whether the next stroke shall be defined as a continuation of the instant stroke or whether it shall be defined by the next succeeding word.

4. A stroke signal generating system including signal generating apparatus for deriving signals suitable for directing a marker to traverse any of a plurality of predetermined patterns of strokes, each pattern representing a different character, wherein said apparatus comprises, a memory for storing a plurality of digital words, each representing in coded form a stroke to be traced in a predetermined direction in a predetermined time, said words being stored in groups, each group representing the pattern of strokes required for one character, said memory being divided into a plurality of blocks each containing the same number of addresses and each being for storing a pair of groups of words corresponding to a preselected pair of characters, one of the groups of each pair being stored at those adjacent addresses beginning at one end of its blocks while the other group of each pair is stored at those adjacent addresses beginning at the other end of its block, first means responsive to an instruction to write a particular character for selecting that block in which the corresponding group of words is stored, second means responsive to an instruction to write a particular character for selecting that end of the selected block in which the group of words corresponding to that particular character is stored and for reading sequentially the words in that group which are stored at addresses beginning at the selected end, and means for decoding the words so read and for deriving therefrom a series of digital signals indicative of the intensity and direction of movement of a marker required to write the selected character.

5. A system in accordance with claim 4 in which each of said groups includes a word specifying that the pattern has been completed.

6. A system in accordance with claim 4 in which each group that includes two words calling for successive strokes having opposite vertical directions at the top or bottom of the pattern, includes an auxiliary word, interposed between said two words, containing coded instructions to blank said marker and hold it at its then attained position.

7. A system in accordance with claim 4 in which said second means includes an up-down counter, conditioned by said instruction to count either up or down depending upon the end of the selected block in which the corresponding group of words is stored, said counter being for reading sequentially the words of that group which are stored at addresses beginning at the selected end.

8. A stroke signal generating system comprising circuitry, responsive to an instruction to write a selected one of a repertoire of characters, for generating a series of signals indicative of the direction of movement and writing intensity required of a marker to trace the selected character, characterized in that such circuitry includes a memory having stored therein a plurality of digital words arranged in groups, each word representing in coded form the characteristics of a stroke, each group representing the characteristics of all the strokes required to write one character, characterized in that said memory is divided into a plurality of blocks of addresses, each block being for storing two groups of words at addresses beginning at opposite ends thereof, and in that said circuitry includes means responsive to the aforesaid instruction for selecting that block in which the group of words corresponding to the selected character is stored and for reading the words of one of the groups stored in that block beginning at one or the other end of the block depending upon which end includes addresses of words in the group corresponding to the selected character, whereby the required series of signals is generated.

9. A system, comprising, a memory having stored therein a plurality of digital words each defining in coded form a stroke to be traced, each of said words including an auxiliary bit having a first or second condition specifying whether or not, respectively, the next stroke shall be defined as a continuation of the instant stroke, a counter actuated by pulses for addressing said memory and reading out words corresponding to the count registered thereby, first means for establishing an initial count whereby an initial word corresponding thereto is read out of said memory, a decoder and buffer actuated by pulses for decoding each word, exclusive of said auxiliary bit, after being read out of said memory and for storing the decoded information temporarily pending receipt of a subsequent pulse, a clock for generating a series of pulses, a circuit for connecting said clock to said counter and to said decoder and buffer, whereby the first pulse initiates actuation of said decoder and buffer to decode said initial word and store the information content thereof and also initiates the advance of said counter and the reading of the next word from said memory, and means responsive to the sensing of said first condition of said auxiliary bit in any word when read out for holding said decoded information pertaining to that word in said buffer for two pulse periods.

10. A system in accordance with claim 9 in which said means responsive includes means for inhibiting that pulse next following the pulse which initiates decoding of that word which included said first condition.

11. A system in accordance with claim 9 in which said circuit includes an AND circuit interposed between said clock and said counter and said decoder and buffer and in which said means responsive includes means for blocking the passage through said AND circuit of that pulse next following the pulse which initiated decoding of that word which included said first condition.

12. A system in accordance with claim 11 in which said means responsive includes a flip flop circuit actuated by pulses received directly from said clock and enabled by the reading out of said first condition for blocking said AND circuit.

* * * * *